United States Patent
Yonemura et al.

(10) Patent No.: US 8,779,076 B2
(45) Date of Patent: *Jul. 15, 2014

(54) THERMOPLASTIC ACRYLIC RESIN AND MOLDED BODY FOR OPTICAL MEMBER

(75) Inventors: Masami Yonemura, Tokyo (JP); Mayuko Kimura, Tokyo (JP); Michio Ogawa, Okayama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/810,265

(22) PCT Filed: Dec. 24, 2008

(86) PCT No.: PCT/JP2008/073449
§ 371 (c)(1),
(2), (4) Date: Sep. 29, 2010

(87) PCT Pub. No.: WO2009/084541
PCT Pub. Date: Jul. 9, 2009

(65) Prior Publication Data
US 2011/0009585 A1    Jan. 13, 2011

(30) Foreign Application Priority Data

Dec. 27, 2007 (JP) ............... P2007-336187
Jul. 31, 2008 (JP) ............... P2008-198678
Jul. 31, 2008 (JP) ............... P2008-198687

(51) Int. Cl.
C08F 20/08 (2006.01)
C08F 20/30 (2006.01)

(52) U.S. Cl.
USPC ..... 526/326; 526/347; 526/329.3; 526/329.5; 526/271

(58) Field of Classification Search
None
See application file for complete search history.

(56) References Cited

U.S. PATENT DOCUMENTS

| | | | |
|---|---|---|---|
| 5,041,348 A | 8/1991 | Kato et al. | |
| 5,187,012 A * | 2/1993 | Takahashi et al. | 428/402 |
| 5,574,117 A * | 11/1996 | Yoshida et al. | 526/224 |
| 2008/0266493 A1 | 10/2008 | Yonezawa et al. | |

FOREIGN PATENT DOCUMENTS

| | | |
|---|---|---|
| EP | 470260 A1 * | 2/1992 |
| JP | 48-14413 | 5/1973 |
| JP | 48-14414 | 5/1973 |
| JP | 49-12088 | 3/1974 |
| JP | 49-12089 | 3/1974 |
| JP | 49-13852 | 4/1974 |
| JP | 57-153008 | 9/1982 |
| JP | S59-221314 A | 12/1984 |
| JP | S60-071661 | 4/1985 |
| JP | S60-147417 A | 8/1985 |
| JP | S63-264613 A | 11/1988 |
| JP | 64-14220 | 1/1989 |
| JP | 03086712 A * | 4/1991 |
| JP | 3-123356 | 5/1991 |
| JP | H04-227613 A | 8/1992 |
| JP | H04-356501 A | 12/1992 |
| JP | 05186659 A * | 7/1993 |
| JP | 5-288929 | 11/1993 |
| JP | 05311025 A * | 11/1993 |
| JP | 8-85729 | 4/1996 |
| JP | 10130449 A * | 5/1998 |
| JP | 2886893 | 2/1999 |
| JP | 3521374 | 2/2004 |
| JP | 2005-148720 | 6/2005 |
| JP | 3711666 | 8/2005 |
| JP | 2006-131898 A | 5/2006 |
| JP | 2006-274118 A | 10/2006 |
| JP | 2007-169622 | 7/2007 |
| JP | 2007-261265 | 10/2007 |
| TW | 200517428 | 6/2005 |

OTHER PUBLICATIONS

Kinoshita et al; JP 05-186659; Machine Translation; Jul. 1993.*
English Translation of Manabe; JP 10-130449 A; May 1998.*
PCTJP2008073449 International Preliminary Report on patentability, Aug. 26, 2010.
Office Action issued in the related U.S. Appl. No. 13/055,933 dated on Jul. 3, 2013.

* cited by examiner

Primary Examiner — Robert C Boyle
(74) Attorney, Agent, or Firm — Morgan, Lewis & Bockius LLP

(57) ABSTRACT

The present invention provides a thermoplastic acrylic resin comprising (i) a repeating unit derived from a methacrylate monomer, (ii) a repeating unit derived from a vinyl aromatic monomer, (iii) a repeating unit derived from an aromatic group-containing methacrylate monomer, and (iv) a cyclic acid anhydride repeating unit, and a molding for optical material comprising the same.

16 Claims, 1 Drawing Sheet

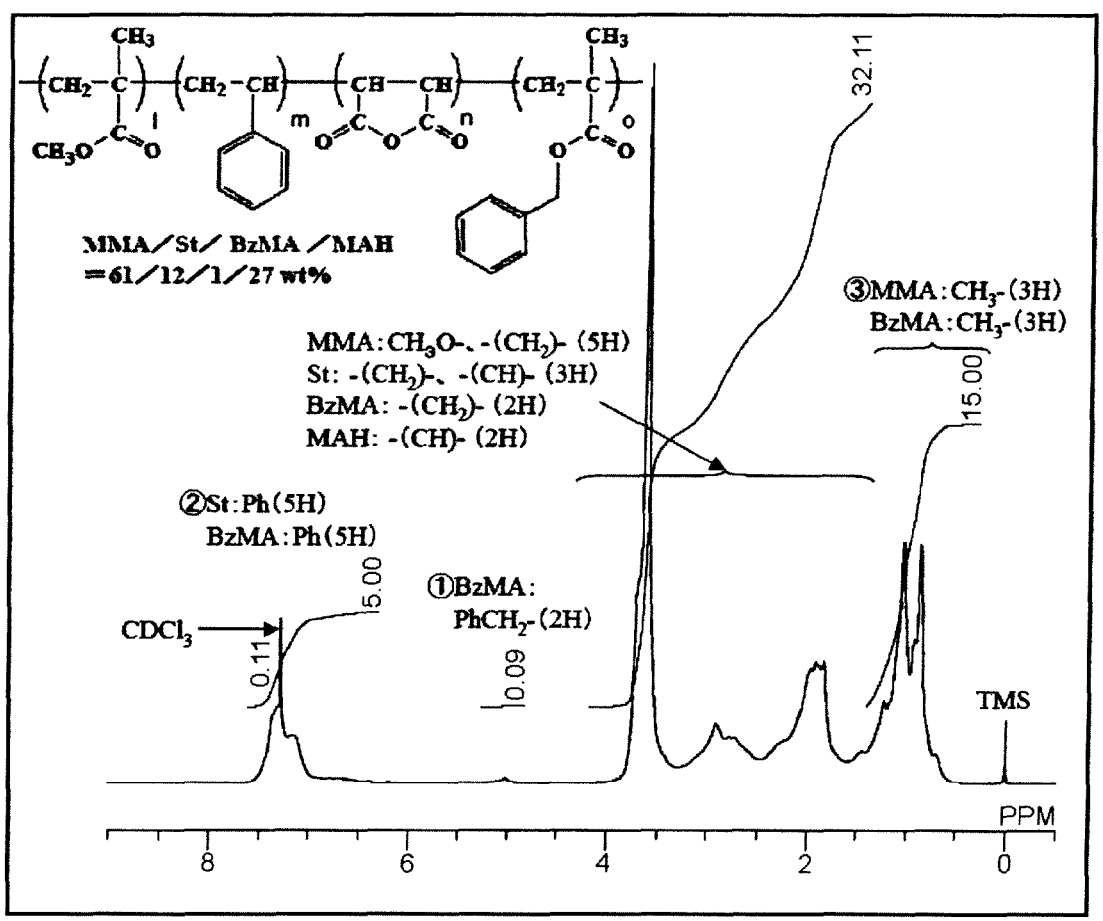

US 8,779,076 B2

THERMOPLASTIC ACRYLIC RESIN AND MOLDED BODY FOR OPTICAL MEMBER

CROSS-REFERENCE TO RELATED APPLICATIONS

The present application is a U.S. National Phase Application of International Application PCT/JP2008/073449, filed Dec. 24, 2008, which claims the benefit of Japanese Patent Application Nos. P2007-336187, filed Dec. 27, 2007, P2008-198687, filed Jul. 31, 2008 and P2008-198678, filed Jul. 31, 2008, which are hereby incorporated by reference in its entirety.

TECHNICAL FIELD

The present invention relates to a thermoplastic acrylic resin having excellent optical properties and to a molding for optical material comprising the same.

BACKGROUND ART

With the advance of flat panel displays (e.g., liquid crystal displays, plasma displays, and organic EL displays), infrared sensors, optical waveguides, etc., optical material used therein has been demanded to be not only excellent in transparency but also have high heat resistance and high optical isotropy (so-called low birefringence), in recent years.

For example, increase in the sizes of flat panel displays also results in increase in the sizes of necessary moldings for optical material. Due to biased external forces, birefringence distribution takes place, causing the problem of contrast reduction. Thus, material that has small birefringence change caused by external forces, i.e., a small absolute value of a photoelastic coefficient, has been demanded for reducing birefringence distribution.

Moreover, with increase in the sizes of flat panel displays, they have increasing opportunities to be viewed not only from the front but also sideways. In such a case, the displays, in principle, present the problem of display color change or contrast reduction depending on the angle at which they are viewed. Thus, material that has a small absolute value of birefringence has been demanded for improving viewing angles.

Methacrylic resins typified by methyl methacrylate homopolymers (PMMAs) are excellent in transparency and have small birefringence. Therefore, they have been used as material having optical isotropy in various optical applications. However, material properties currently required for the market have shifted to minimized birefringence, smaller birefringence change caused by external forces, and higher heat resistance. The development of material that simultaneously satisfies these properties has been awaited (see Non-Patent Documents 1 and 2).

A ternary copolymer which comprises, of four monomers constituting a thermoplastic acrylic resin of the present invention, methyl methacrylate, styrene, and maleic anhydride except for benzyl methacrylate is disclosed in, for example, Patent Documents 1 to 3, as the related art to the present invention. Patent Document 1 states that a weight ratio (a/b) of a content (a) of the repeating unit derived from a vinyl aromatic monomer to a content (b) of the cyclic acid anhydride repeating unit in the ternary copolymer is preferably not smaller than 1 and smaller than 3, in terms of heat distortion resistance, weather resistance, etc. On the other hand, Patent Document 2 makes mention of neither the content ratio (a/b) nor effects expected from the range thereof and merely states a ternary copolymer having an a/b ratio larger than 1 (a/b=14/10) as Example. Likewise, Patent Document 3 makes mention of neither the weight ratio (a/b) of a content (a) of the repeating unit derived from a vinyl aromatic monomer to a content (b) of the cyclic acid anhydride repeating unit nor effects expected from the range thereof and merely states a ternary copolymer having an a/b ratio larger than 1 (a/b=15/12) as Example.

Moreover, Patent Document 4 discloses a copolymer comprising methyl methacrylate and any one or more of copolymerizable monomers such as styrene, benzyl methacrylate, and maleic anhydride. Patent Document 4 discloses the copolymer as one of compositions constituting an antistatic thermoplastic laminate and does not make any mention of optical properties. Furthermore, the document does not show Example corresponding to the quaternary copolymer of the present invention.

Moreover, Patent Document 5 discloses a copolymer comprising styrenes, maleic anhydrides, and methacrylates. Specifically, Patent Document 5 states that methyl methacrylate and benzyl methacrylate may be copolymerized as the methacrylates in the copolymer. However, the document does not show Example corresponding to the quaternary copolymer of the present invention comprising methyl methacrylate, styrene, benzyl methacrylate, and maleic anhydride. Furthermore, it also states that esters comprising a lower alkyl group are preferable as the methacrylates and does not give any suggestion about the repeating unit derived from an aromatic group-containing methacrylate monomer of the present invention. Furthermore, it also states that a copolymer in which a portion or the whole of the constitutional unit maleic anhydride has been hydrolyzed is a preferable resin.

Moreover, Patent Document 6 discloses a copolymer mainly composed of monomers selected from styrenes, maleic anhydrides, and methacrylates. Examples of the monomers of methacrylates disclosed therein include methyl methacrylate and benzyl methacrylate. Specifically, Patent Document 6 discloses a blend of a copolymer comprising styrenes and methacrylates and a copolymer comprising maleic anhydrides and methacrylates and a blend of a copolymer comprising styrenes and maleic anhydrides and a copolymer comprising maleic anhydrides and methacrylates and does not make any mention of effects obtain by the simultaneous copolymerization of three or more monomers. Particularly, the document does not show Example corresponding to the quaternary copolymer of the present invention. It also states that esters comprising a lower alkyl group are preferable as the methacrylates in the copolymer and does not give any suggestion about the repeating unit derived from an aromatic group-containing methacrylate monomer of the present invention. Furthermore, it also states that a copolymer in which a portion or the whole of the constitutional unit maleic anhydride has been hydrolyzed is a preferable resin.

Furthermore, Patent Document 7 discloses a copolymer of maleic anhydride and acrylate. Specifically, Patent Document 7 states that methyl (meth)acrylate and benzyl (meth)acrylate may be used in combination as the acrylate monomers in the copolymer and that styrenes may be copolymerized therewith as additional monomers without impairing heat resistance. However, the document does not show Example corresponding to the quaternary copolymer of the present invention.

CITATION LIST

[Patent Document 1] Japanese Patent No. 1704667
[Patent Document 2] Japanese Patent No. 2886893

[Patent Document 3] Japanese Patent Laid-Open No. 5-288929
[Patent Document 4] Japanese Patent Laid-Open No. 8-85729
[Patent Document 5] Japanese Patent No. 3521374
[Patent Document 6] Japanese Patent No. 3711666
[Patent Document 7] Japanese Patent Laid-Open No. 2007-261265
[Non-Patent Document 1] Chemical Review, No. 39, 1988 (published by Japan Scientific Societies Press)
[Non-Patent Document 2] Monthly Display, April issue, 2005

SUMMARY OF INVENTION

Problems to be Solved by the Invention

An object of the present invention is to provide a thermoplastic acrylic resin excellent in optical properties and a molding for optical material comprising the same.

Means for Solving the Problems

The present invention has been completed based on the surprising fact that a molding for optical material comprising a particular thermoplastic acrylic resin, e.g., an optical film of the resin, can simultaneously achieve lower birefringence and a lower photoelastic coefficient than those of conventional optical films.

Specifically, the present invention relates to:
[1] A thermoplastic acrylic resin comprising: a repeating unit derived from a methacrylate monomer represented by the following formula (1); a repeating unit derived from a vinyl aromatic monomer represented by the following formula (2); a repeating unit derived from an aromatic group-containing methacrylate monomer represented by the following formula (3); and a cyclic acid anhydride repeating unit represented by the following formula (4) or (5):

[Chemical Formula 1]

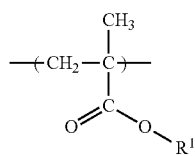

(1)

wherein $R^1$ represents hydrogen, a linear or branched alkyl group having 1 to 12 carbon atoms, or a cycloalkyl group having 5 to 12 carbon atoms,

[Chemical Formula 2]

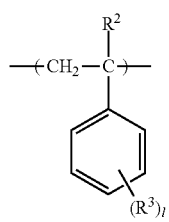

(2)

wherein $R^2$ and $R^3$ may be the same or different and each represents hydrogen, halogen, a hydroxyl group, an alkoxy group, a nitro group, or a linear or branched alkyl group having 1 to 12 carbon atoms, and l represents an integer of 1 to 3,

[Chemical Formula 3]

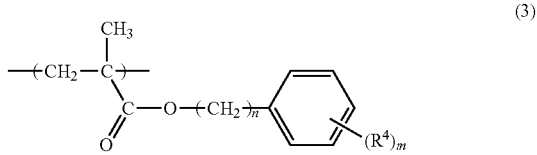

(3)

wherein $R^4$ represents hydrogen, halogen, a hydroxyl group, an alkoxy group, a nitro group, or a linear or branched alkyl group having 1 to 12 carbon atoms, m represents an integer of 1 to 3, and n represents an integer of 0 to 2,

[Chemical Formula 4]

(4)

[Chemical Formula 5]

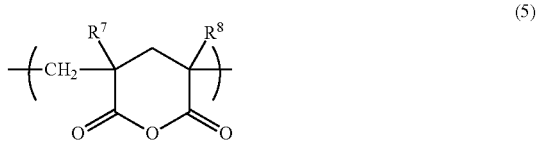

(5)

wherein $R^5$ to $R^8$ may be the same or different and each represents hydrogen or a linear or branched alkyl group having 1 to 12 carbon atoms.

[2] The thermoplastic acrylic resin according to [1], wherein the thermoplastic acrylic resin has a weight-average molecular weight in the range of 10,000 to 400,000 and a molecular weight distribution in the range of 1.8 to 3.0 determined by a GPC measurement method.

[3] The thermoplastic acrylic resin according to [1] or [2], characterized in that the thermoplastic acrylic resin comprises 10 to 70% by weight of the repeating unit derived from a methacrylate monomer represented by the formula (1), 5 to 40% by weight of the repeating unit derived from a vinyl aromatic monomer represented by the formula (2), 0.1 to 5% by weight of the repeating unit derived from an aromatic group-containing methacrylate monomer represented by the formula (3), and 20 to 50% by weight of the cyclic acid anhydride repeating unit represented by the formula (4) or (5).

[4] The thermoplastic acrylic resin according to any of [1] to [3], characterized in that a molar ratio (B/A) of a content (B) of the cyclic acid anhydride repeating unit to a content (A) of the repeating unit derived from a vinyl aromatic monomer is larger than 1 and not larger than 10.

[5] The thermoplastic acrylic resin according to any of [1] to [4], wherein the repeating unit derived from a methacrylate monomer is derived from methyl methacrylate, the repeating unit derived from a vinyl aromatic monomer is derived from styrene, the repeating unit derived from an aromatic group-containing methacrylate monomer is derived from benzyl methacrylate, and the cyclic acid anhydride repeating unit is derived from maleic anhydride.

[6] The thermoplastic acrylic resin according to any of [1] to [5], wherein the thermoplastic acrylic resin satisfies the following optical property (i):
(i) an absolute value of a photoelastic coefficient is not higher than $3.0 \times 10^{-12}$ $Pa^{-1}$.

[7] The thermoplastic acrylic resin according to any of [1] to [6], wherein the thermoplastic acrylic resin satisfies the following optical property (ii):
(ii) a value of a slope K in the equation (a) of linear relationship between birefringence ($\Delta n(S)$) after drawing and a draw ratio (S) determined by least squares approximation satisfies the following expression (b):

$$\Delta n(S) = K \times S + C \qquad (a)$$

$$|K| < 0.30 \times 10^{-6} \qquad (b).$$

[8] The thermoplastic acrylic resin according to any of [1] to [7], wherein the thermoplastic acrylic resin further satisfies the following optical property (iii):
(iii) an absolute value of retardation (Re) in the in-plane direction is not higher than 30 nm.

[9] The thermoplastic acrylic resin according to any of [1] to [8], wherein the thermoplastic acrylic resin further satisfies the following optical property (iv):
(iv) an absolute value of retardation (Rth) in the thickness direction is not higher than 30 nm.

[10] The thermoplastic acrylic resin according to any of [1] to [9], wherein the thermoplastic acrylic resin further satisfies the following optical property (v):
(v) a ratio (Rth/Re) of the retardation (Rth) in the thickness direction to the retardation (Re) in the in-plane direction satisfies the following expression (c):

$$0.1 < Rth/Re < 1 \qquad (c).$$

[11] The thermoplastic acrylic resin according to any of [1] to [10], characterized in that the thermoplastic acrylic resin further satisfies the following condition (vi):
(vi) the resin has a glass transition temperature (Tg) of 120° C. or higher.

[12] The thermoplastic acrylic resin according to any of [1] to [11], characterized in that the thermoplastic acrylic resin further satisfies the following condition (vii):
(vii) the resin has total light transmittance of 85% or higher.

[13] A molding for optical material comprising a thermoplastic acrylic resin according to any of [1] to [12].

[14] The molding for optical material according to [13], wherein the molding for optical material is an optical film.

[15] The optical film according to [14], characterized in that the optical film is a film which is formed by extrusion molding and drawn at a draw ratio of 0.1 to 300% at least in the uniaxial direction.

[16] The optical film according to [14], characterized in that the optical film is a film which is formed by cast molding and drawn at a draw ratio of 0.1 to 300% at least in the uniaxial direction.

[17] A polarizing plate protective film comprising an optical film according to any of [14] to [16].

[18] A retarder film comprising an optical film according to any of [14] to [16].

[19] The molding for optical material according to [13], wherein the molding for optical material is an optical lens.

Effect of the Invention

The present invention can provide a thermoplastic acrylic resin excellent in optical properties and a molding for optical material comprising the same. Particularly, the present invention can provide a thermoplastic resin excellent in at least one optical property of a photoelastic coefficient, birefringence, and retardation and a molding for optical material comprising the same.

BRIEF DESCRIPTION OF DRAWINGS

FIG. 1 is a $^1$H-NMR spectrum chart of a thermoplastic acrylic resin (Example 1).

DESCRIPTION OF EMBODIMENTS

[Thermoplastic Acrylic Resin]

A thermoplastic acrylic resin of the present invention comprises: a repeating unit derived from a methacrylate monomer represented by the following formula (1); a repeating unit derived from a vinyl aromatic monomer represented by the following formula (2); a repeating unit derived from an aromatic group-containing methacrylate monomer represented by the following formula (3); and a cyclic acid anhydride repeating unit represented by the following formula (4) or (5):

[Chemical Formula 6]

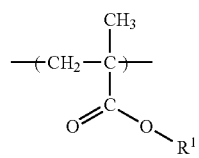

(1)

wherein $R^1$ represents hydrogen, a linear or branched alkyl group having 1 to 12 carbon atoms, or a cycloalkyl group having 5 to 12 carbon atoms,

[Chemical Formula 7]

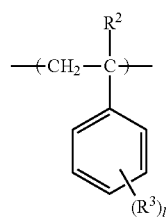

(2)

wherein $R^2$ and $R^3$ may be the same or different and each represents hydrogen, halogen, a hydroxyl group, an alkoxy group, a nitro group, or a linear or branched alkyl group having 1 to 12 carbon atoms, and l represents an integer of 1 to 3,

[Chemical Formula 8]

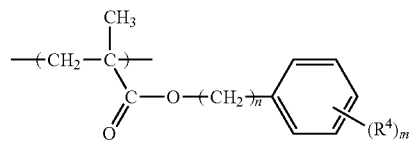

(3)

wherein R⁴ represents hydrogen, halogen, a hydroxyl group, an alkoxy group, or a linear or branched alkyl group having 1 to 12 carbon atoms, m represents an integer of 1 to 3, and n represents an integer of 0 to 2,

[Chemical Formula 9]

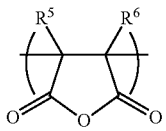

(4)

[Chemical Formula 10]

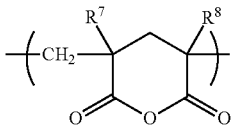

(5)

wherein R⁵ to R⁸ may be the same or different and each represents hydrogen or a linear or branched alkyl group having 1 to 12 carbon atoms.

In the thermoplastic acrylic resin, the repeating unit represented by the formula (1) is derived from methacrylic acid and methacrylate monomers. Examples of the methacrylate used include methyl methacrylate, ethyl methacrylate, propyl methacrylate, isopropyl methacrylate, n-butyl methacrylate, isobutyl methacrylate, t-butyl methacrylate, 2-ethylhexyl methacrylate, and cyclohexyl methacrylate. These methacrylic acid and methacrylates may be used alone or in combination of two or more of them.

Of these methacrylates, alkyl methacrylate containing an alkyl group having 1 to 7 carbon atoms is preferable. Methyl methacrylate is particularly preferable because the resultant thermoplastic acrylic resin is excellent in heat resistance and transparency.

The content of the repeating unit represented by the formula (1) is 10 to 70% by mass, preferably 25 to 70% by mass, more preferably 40 to 70% by mass, from the viewpoint of transparency.

The repeating unit represented by the formula (2) is derived from a vinyl aromatic monomer. Examples of the monomer used include styrene, 2-methylstyrene, 3-methylstyrene, 4-methylstyrene, 2,4-dimethylstyrene, 2,5-dimethylstyrene, 2-methyl-4-chlorostyrene, 2,4,6-trimethyl styrene, α-methylstyrene, cis-β-methyl styrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2-chlorostyrene, 3-chlorostyrene, 4-chlorostyrene, 2,4-dichlorostyrene, 2,6-dichlorostyrene, 2-bromostyrene, 3-bromostyrene, 4-bromostyrene, 2,4-dibromostyrene, α-bromostyrene, β-bromostyrene, 2-hydroxystyrene, and 4-hydroxystyrene. These vinyl aromatic monomers may be used alone or in combination of two or more of them.

Of these monomers, styrene and α-methylstyrene are preferable because they are easily copolymerized.

The content of the repeating unit represented by the formula (2) is 5 to 40% by mass, preferably 5 to 30% by mass, more preferably 5 to 20% by mass, from the viewpoint of transparency and heat resistance.

The thermoplastic acrylic resin of the present invention comprises the repeating unit represented by the formula (3), thereby maintaining its heat resistance and birefringence while exhibiting a minimized photoelastic coefficient as optical properties.

The repeating unit represented by the formula (3) is derived from an aromatic group-containing methacrylate monomer. Examples of the monomer used include phenyl methacrylate, benzyl methacrylate, and 1-phenylethyl methacrylate. These monomers may be used alone or in combination of two or more of them. Of these monomers, benzyl methacrylate is particularly preferable.

The content of the repeating unit represented by the formula (3) is 0.1 to 5% by mass, preferably 0.1 to 4% by mass, more preferably 0.1 to 3% by mass, for exhibiting optical properties as the advantages of the present invention (particularly, reducing a low photoelastic coefficient (described later) to the minimum) at a higher level.

The cyclic acid anhydride repeating unit represented by the formula (4) is derived from unsubstituted and/or substituted maleic anhydride. Examples of the monomer used include maleic anhydride, citraconic anhydride, dimethylmaleic anhydride, dichloromaleic anhydride, bromomaleic anhydride, dibromomaleic anhydride, phenylmaleic anhydride, and diphenylmaleic anhydride. Of these monomers, maleic anhydride is preferable because it is easily copolymerized.

The cyclic acid anhydride repeating unit represented by the formula (5) is derived through the cyclocondensation reaction between the repeating units described later. Examples thereof include glutaric anhydride.

In the thermoplastic acrylic resin of the present invention, the cyclic acid anhydride repeating unit represented by the formula (4) or (5) is possibly ring-opened through partial hydrolysis due to external environments such as moisture in the air. In the acrylic resin of the present invention, the rate of hydrolysis is preferably less than 10% by mol, more preferably less than 5% by mol, even more preferably less than 1% by mol, from the viewpoint of optical properties and heat resistance.

In this context, the rate of hydrolysis (% by mol) is determined according to the expression: {1−(the amount (mol) of the cyclic acid anhydride after hydrolysis)/the amount (mol) of the cyclic acid anhydride before hydrolysis}×100.

The content of the cyclic acid anhydride repeating unit represented by the formula (4) or (5) is 20 to 50% by mass, preferably 20 to 45% by mass, for achieving high heat resistance and optical properties as the advantages of the present invention (particularly, controlling retardation (described later)) at a higher level. However, in the thermoplastic acrylic resin of the present invention, a molar ratio (B/A) of the content (B) of the cyclic acid anhydride repeating unit represented by the formula (4) or (5) to the content (A) of the repeating unit derived from a vinyl aromatic monomer represented by the formula (2) is preferably larger than 1 and not larger than 10, more preferably larger than 1 and not larger than 5.

The thermoplastic acrylic resin of the present invention has a weight-average molecular weight (Mw) in the range of 10,000 to 400,000, preferably 40,000 to 300,000, more preferably 70,000 to 200,000, in terms of PMMA standards and a molecular weight distribution (Mw/Mn) in the range of 1.8 to 3.0, preferably 1.8 to 2.7, more preferably 1.8 to 2.5, determined by a GPC measurement method.

The glass transition temperature (Tg) of the thermoplastic acrylic resin of the present invention can be controlled arbitrarily by resin composition and is preferably controlled to 120° C. or higher, more preferably 130° C. or higher, even more preferably 135° C. or higher, from the viewpoint of industrial applicability.

[Polymerization Reaction]

The thermoplastic acrylic resin of the present invention can be prepared, for example, using polymerization methods generally performed such as cast polymerization, bulk polymerization, suspension polymerization, solution polymerization, emulsion polymerization, and anionic polymerization. For optical material applications, it is preferred that contamination with minute foreign substances should be avoided as much as possible. From this viewpoint, cast polymerization and solution polymerization, which do not involve using suspending or emulsifying agents, are preferably used.

Moreover, any of, for example, batch polymerization and continuous polymerization, can be used as a polymerization process. A continuous polymerization process is preferably used because the resultant polymer has higher compositional homogeneity.

The temperature and the polymerization time in the polymerization reaction vary depending on the types and contents of the monomers used, etc., and are, for example, a polymerization temperature of 0 to 150° C. and a polymerization time of 0.5 to 24 hours, preferably a polymerization temperature of 80 to 150° C. and a polymerization time of 1 to 12 hours.

When a solvent is used in the polymerization reaction, examples of the polymerization solvent include: aromatic hydrocarbon-based solvents such as toluene, xylene, and ethylbenzene; ketone-based solvents such as methyl ethyl ketone and methyl isobutyl ketone; and ether-based solvents such as tetrahydrofuran. These solvents may be used alone or in combination of two or more of them. A solvent having a melting point of 50 to 200° C. is preferable because too high a melting point of the solvent used increases volatile contents remaining in the finally obtained thermoplastic acrylic resin.

In the polymerization reaction, a polymerization initiator may be added, if necessary.

Any initiator generally used in radical polymerization can be used as the polymerization initiator. Examples thereof can include: organic peroxides such as cumene hydroperoxide, diisopropylbenzene hydroperoxide, di-t-butyl peroxide, lauroyl peroxide, benzoyl peroxide, t-butyl peroxyisopropylcarbonate, and t-amyl peroxy-2-ethylhexanoate; and azo compounds such as 2,2'-azobis(isobutyronitrile), 1,1'-azobis(cyclohexanecarbonitrile), 2,2'-azobis(2,4-dimethylvaleronitrile), and dimethyl-2,2'-azobisisobutyrate. These polymerization initiators may be used alone or in combination of two or more of them.

The amount of the polymerization initiator used is not particularly limited and may be set appropriately according to monomer combination, reaction conditions, etc. Preferably, the polymerization initiator is not particularly limited and is used in the range of 0.005 to 5 wt %.

A molecular weight regulator used, if necessary, in the polymerization reaction is any of those used in general radical polymerization. Particularly preferable examples thereof include mercaptan compounds such as butyl mercaptan, octyl mercaptan, dodecyl mercaptan, and 2-ethylhexyl thioglycolate. These molecular weight regulators are added in a concentration range which controls the degree of polymerization within the ranges described above.

In the polymerization reaction, the concentration of the thermoplastic acrylic resin produced in the polymerization reaction solution is preferably controlled to 50% by mass or lower for suppressing the gelation of the polymerization reaction solution. Specifically, when the concentration of the thermoplastic acrylic resin produced in the polymerization reaction solution exceeds 50% by mass, it is preferred that a polymerization solvent should be added appropriately to the polymerization reaction solution to control the concentration to 50% by mass or lower. The concentration of the thermoplastic acrylic resin produced in the polymerization reaction solution is more preferably 45% by mass or lower, even more preferably 40% by mass or lower.

However, the concentration of the thermoplastic acrylic resin produced in the polymerization reaction solution is preferably 10% by mass or higher, more preferably 20% by mass or higher, from the viewpoint of securing productivity.

The manner in which a polymerization solvent is added appropriately to the polymerization reaction solution is not particularly limited. For example, the polymerization solvent may be added continuously or intermittently. Thus, the gelation of the reaction solution can be suppressed more sufficiently by controlling the concentration of the thermoplastic acrylic resin produced in the polymerization reaction solution. The added polymerization solvent may be, for example, the same kind of solvent as the initially charged one used in the polymerization reaction or a different kind of solvent therefrom. The same kind of solvent as the initially charged one used in the polymerization reaction is preferably used. Moreover, the added polymerization solvent may be a single solvent or a mixed solvent of two or more kinds.

[Cyclocondensation Reaction]

In the thermoplastic acrylic resin of the present invention, the thermoplastic acrylic resin comprising the cyclic acid anhydride repeating unit represented by the formula (5) is derived by heat treatment from the thermoplastic acrylic resin comprising the repeating units represented by the formulas (1), (2), and (3).

Specifically, the thermoplastic acrylic resin comprising the cyclic acid anhydride repeating unit represented by the formula (5) is derived by heat treatment whereby cyclocondensation reaction represented by (i) carboxyl group+carboxyl group→cyclic acid anhydride+water

[Chemical Formula 11]

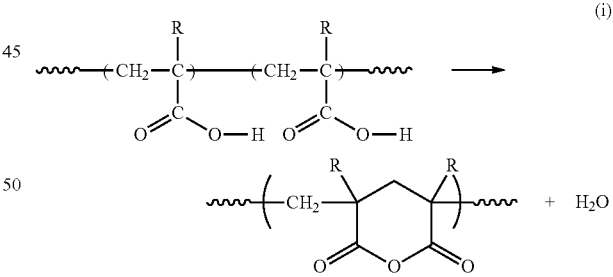

(ii) carboxyl group+ester group→cyclic acid anhydride+alcohol

[Chemical Formula 12]

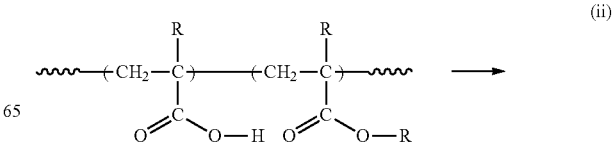

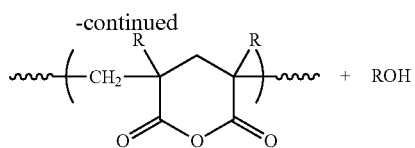 + ROH occurs between the repeating units represented by the formulas (1) and (3) to form the cyclic acid anhydride repeating unit represented by the formula (5).

The cyclic acid anhydride repeating unit is thus formed, thereby imparting high heat resistance and high optical isotropy to the thermoplastic acrylic resin of the present invention. An insufficient reaction rate of this cyclocondensation reaction reduces optical isotropy and insufficiently improves heat resistance. Moreover, the resultant resin, when molded, might undergo condensation reaction in the midstream of molding due to heat treatment, causing gelation or water or alcohol formation, which in turn appears as bubbles or silver streaks in molded articles.

Examples of the heat treatment method for promoting the cyclocondensation reaction include methods previously known in the art, such as: a method which comprises directly heat-treating the solvent-containing polymerization reaction solution obtained by the polymerization step; a method which comprises performing heat treatment in the presence of a solvent coexisting with a cyclization catalyst if necessary; and a method which comprises performing heat treatment using a furnace or reactor equipped with a vacuum or devolatilization apparatus, an extruder equipped with a devolatilization apparatus, etc., for removing volatile components.

In the cyclocondensation reaction, for example, esterification or transesterification catalysts (e.g., p-toluenesulfonic acid), organic carboxylic acids (e.g., acetic acid, propionic acid, benzoic acid, acrylic acid, and methacrylic acid), basic compounds, organic carboxylate, and carbonate disclosed in Japanese Patent Laid-Open No. 61-254608 and 61-261303, and organic phosphorus compounds, may be used as the cyclization catalyst, if necessary.

Examples of the organic phosphorus compounds include: alkyl(aryl)phosphonous acid such as methylphosphonous acid, ethylphosphonous acid, and phenylphosphonous acid (these may be in the form of a tautomer alkyl(aryl)phosphinic acid), and monoester or diester thereof; dialkyl(aryl)phosphinic acid such as dimethylphosphinic acid, diethylphosphinic acid, diphenylphosphinic acid, phenylmethylphosphinic acid, and phenylethylphosphinic acid, and ester thereof; alkyl(aryl)phosphonic acid such as methylphosphonic acid, ethylphosphonic acid, trifluoromethylphosphonic acid, and phenylphosphonic acid, and monoester or diester thereof; alkyl(aryl)phosphinous acid such as methylphosphinous acid, ethylphosphinous acid, and phenylphosphinous acid, and ester thereof; mono-, di-, or tri-phosphite such as methyl phosphite, ethyl phosphite, phenyl phosphite, dimethyl phosphite, diethyl phosphite, diphenyl phosphite, trimethyl phosphite, triethyl phosphite, and triphenyl phosphite; mono-, di-, or tri-phosphate such as methyl phosphate, ethyl phosphate, 2-ethylhexyl phosphate, isodecyl phosphate, lauryl phosphate, stearyl phosphate, isostearyl phosphate, phenyl phosphate, dimethyl phosphate, diethyl phosphate, di-2-ethylhexyl phosphate, octyl phosphate, diisodecyl phosphate, dilauryl phosphate, distearyl phosphate, diisostearyl phosphate, diphenyl phosphate, trimethyl phosphate, triethyl phosphate, triisodecyl phosphate, trilauryl phosphate, tristearyl phosphate, triisostearyl phosphate, and triphenyl phosphate; mono-, di-, or tri-alkyl(aryl)phosphine such as methylphosphine, ethylphosphine, phenylphosphine, dimethylphosphine, diethylphosphine, diphenylphosphine, trimethylphosphine, triethylphosphine, and triphenylphosphine; alkyl(aryl)halogenphosphine such as methyldichlorophosphine, ethyldichlorophosphine, phenyldichlorophosphine, dimethylchlorophosphine, diethylchlorophosphine, and diphenylchlorophosphine; mono-, di-, or tri-alkyl(aryl)phosphine oxide such as methylphosphine oxide, ethylphosphine oxide, phenylphosphine oxide, dimethylphosphine oxide, diethylphosphine oxide, diphenylphosphine oxide, trimethylphosphine oxide, triethylphosphine oxide, and triphenylphosphine oxide; and tetraalkyl(aryl)phosphonium halide such as tetramethylphosphonium chloride, tetraethylphosphonium chloride, and tetraphenylphosphonium chloride.

These compounds may be used alone or may be more effective by combination of two or more of them.

The amount of the catalyst used in the cyclocondensation reaction is, for example, preferably 0.001 to 5% by mass, more preferably 0.01 to 2.5% by mass, even more preferably 0.01 to 1% by mass, particularly preferably 0.05 to 0.5% by mass, with respect to the amount of the thermoplastic acrylic resin. An amount of the catalyst used lower than 0.001% by mass might insufficiently improve the reaction rate of the cyclocondensation reaction. On the contrary, an amount of the catalyst used exceeding 5% by mass might cause the staining of the resultant thermoplastic acrylic resin or make melt molding thereof difficult due to crosslinking.

The timing of addition of the catalyst is not particularly limited. For example, the catalyst may be added at the initial stage of the reaction or in the midstream of the reaction, or both.

Moreover, the cyclocondensation reaction is preferably performed in the presence of a solvent and in combination with a devolatilization step. In this case, water or alcohol secondarily produced through the cyclocondensation reaction is forcedly removed by devolatilization. Therefore, equilibrium in the reaction is turned in favor of the production of cyclocondensation products.

[Devolatilization Step]

The devolatilization step means a step of performing treatment to remove (i) volatile contents such as polymerization solvents and residual monomers and/or (ii) water or alcohol secondarily produced through the cyclocondensation reaction, under conditions involving heating under reduced pressure, if necessary. Insufficient removal in this treatment might increase volatile contents remaining in the obtained thermoplastic resin, causing staining due to the alteration, etc., of the molded resin or molding defects such as bubbles or silver streaks.

Examples of an apparatus used in the devolatilization step include: a devolatilization apparatus comprising a heat exchanger and a devolatilizing tank; a vented extruder; and a devolatilization apparatus arranged in series with an extruder. When the vented extruder is used, it may have one or several vents and preferably has several vents.

The devolatilization reaction temperature is preferably 150 to 350° C., more preferably 200 to 300° C. A devolatilization reaction temperature lower than 150° C. might make the cyclocondensation reaction insufficient, and increasing volatile contents remaining in the resultant thermoplastic resin. On the contrary, a devolatilization reaction temperature exceeding 350° C. might cause the staining or degradation of the resultant thermoplastic resin.

The devolatilization reaction pressure is preferably 931 to 1.33 hPa (700 to 1 mmHg), more preferably 798 to 66.5 hPa (600 to 50 mmHg). A devolatilization reaction pressure exceeding 931 hPa (700 mmHg) might facilitate remaining of volatile contents including water or alcohol. On the contrary, a devolatilization reaction pressure lower than 1.33 hPa (1 mmHg) might make industrial practice difficult.

The devolatilization reaction time is selected appropriately depending on a cyclocondensation rate or the amount of volatile contents remaining. A shorter reaction time is more preferable for suppressing the staining or degradation of the resultant thermoplastic acrylic resin.

A smaller number of foreign substances contained in the thermoplastic acrylic resin of the present invention are more preferable for using the resin in optical applications. Examples of a method for reducing the number of foreign substances include a method which comprises filtering a solution or melt of the thermoplastic acrylic resin, for example, through a leaf disc-type polymer filter having filtration accuracy of 1.5 to 15 µm, in the polymerization reaction, cyclocondensation reaction, devolatilization, and molding steps.

[Molding for Optical Material]

A molding for optical material comprising the thermoplastic acrylic resin of the present invention, e.g., an optical film or optical lens, may contain various additives without significantly impairing the advantages of the present invention. The types of the additives are not particularly limited and may be any of those generally used in the formulation of resins or rubbery polymers.

Examples thereof include: inorganic fillers; pigments such as iron oxide; lubricants such as stearic acid, behenic acid, zinc stearate, calcium stearate, magnesium stearate, and ethylene bis(stearamide); mold release agents; softeners or plasticizers such as paraffin-based process oil, naphthene-based process oil, aromatic process oil, paraffin, organic polysiloxane, and mineral oil; antioxidants such as hindered phenol-based antioxidants and phosphorus-based heat stabilizers; hindered amine-based light stabilizers; benzotriazole-based UV absorbers; flame retardants; antistatic agents; reinforcements such as organic fillers, glass fibers, carbon fibers, and metal whiskers; coloring agents; other additives; and mixtures thereof.

The content of the additives in the molding for optical material is preferably 0 to 5% by mass, more preferably 0 to 2% by mass, even more preferably 0 to 1% by mass.

The molding for optical material comprising the thermoplastic acrylic resin of the present invention can be mixed with at least one or more of thermoplastic resins including: polyolefins such as polyethylene and polypropylene; styrenic resins such as polystyrene and styrene-acrylonitrile copolymers; polyamide; polyphenylene sulfide resins; polyether ether ketone resins; polyester; polysulfone; polyphenylene oxide; polyimide or polyetherimide; polyacetal; and cellulose resins such as triacetyl cellulose, and thermosetting resins including: phenol, melamine, silicone, and epoxy resins, without impairing the object of the present invention.

In the present invention, a method for producing the molding for optical material is not particularly limited, and methods known in the art can be utilized. For example, it can be produced using a melt kneading machine such as a single- or double-screw extruder, Banbury mixer, Brabender mixer, or various kneaders. Moreover, in the present invention, an undrawn molding may be formed by methods known in the art such as injection molding, sheet molding, blow molding, injection blow molding, inflation molding, extrusion molding, and foam molding. Fabrication methods such as compressed-air molding and vacuum molding can also be used.

When the molding for optical material of the present invention is in a film or sheet form, an approach such as extrusion molding or cast molding is used. For example, an undrawn film can be formed by extrusion molding using, for example, an extruder equipped with a T-die or round die. It can also be formed through the melt kneading of the various additives and the resins other than the thermoplastic acrylic resin of the present invention during extrusion molding.

Alternatively, the thermoplastic acrylic resin of the present invention is dissolved in a solvent, e.g., chloroform or methylene dichloride, and then cast-molded into an undrawn film through cast-drying/solidification. The method for forming the optical film comprising the thermoplastic acrylic resin of the present invention is preferably extrusion molding from the viewpoint of safety and economic viability, etc., because the risk of exposure to a solvent such as chloroform or methylene dichloride essential to cast molding is absent and the need of incidental equipment such as a drying apparatus for drying/solidification and a solvent recovery apparatus is eliminated.

The obtained undrawn film can be drawn uniaxially in the longitudinal (the machine direction) or uniaxially in the transverse (the direction orthogonal to the machine direction) or can be drawn by a successive biaxial drawing method using roll or tenter drawing, a simultaneous biaxial drawing method using tenter drawing, a biaxial drawing method using tubular drawing, etc., to produce a biaxially drawn film. Such drawing can improve film strength.

The final draw ratio can be determined depending on the thermal shrinkage of the obtained molding. The draw ratio is preferably not smaller than 0.1% and smaller than 300%, more preferably 0.2% to 300% inclusive, particularly preferably 0.3% to 300% inclusive, at least in either uniaxial direction. Thus, a drawn molding preferable from the viewpoint of birefringence, heat resistance, and strength is obtained by setting the draw ratio within this range.

In the present invention, the extrusion molding or cast molding and the drawing can be performed successively. In this context, the molding for optical material of the present invention, e.g., the optical film, can be subjected, after the drawing treatment, to heat treatment (annealing), etc., for stabilizing its optical isotropy or mechanical properties.

The heat treatment conditions are not particularly limited and may be selected appropriately in the same way as those conducted on drawn films previously known in the art.

In the present invention, the film and the sheet differ only in thickness. The film refers to those having a thickness of 300 µm or smaller, while the sheet refers to those having a thickness exceeding 300 µm. Moreover, the film is preferably 1 µm or larger, more preferably 5 µm or larger, in thickness. The sheet is preferably 10 mm or smaller, more preferably 5 mm or smaller, in thickness.

The molding for optical material comprising the thermoplastic acrylic resin of the present invention can be used suitably in polarizing plate protective films used in liquid crystal displays, plasma displays, organic EL displays, field emission displays, and displays for rear projection television, retarder films (e.g., quarter- or half-wave plates), optical compensation films for liquid crystals (e.g., viewing angle control films), display front panels, display boards, lenses, transparent substrates used in solar cells, etc.

In addition, the molding for optical material can also be used in waveguides, lenses, optical fibers, covering material for optical fibers, LED lenses, lens covers, etc., in the fields of optical communication, optical switching, and optical measurement systems. The optical material comprising the molding of the present invention can also be subjected to, for example, surface functionalization treatment such as antireflection, transparent conductive, electromagnetic shielding, or gas barrier treatment.

[Optical Film]

The optical film formed from the thermoplastic acrylic resin of the present invention is used in applications that require or do not require the birefringence of the optical film in terms of industrial applications. The applications that do not require the birefringence are, for example, polarizing plate protective films, while the applications that require the birefringence are, for example, retarder films.

The optical film formed from the thermoplastic acrylic resin of the present invention satisfies the following optical property (i):
(i) an absolute value of a photoelastic coefficient is not higher than $3.0 \times 10^{-12}$ $Pa^{-1}$.

Preferably, the optical film further satisfies the following optical property (ii):
(ii) a value of a slope K in the equation (a) of linear relationship between birefringence ($\Delta n(S)$) after drawing and a draw ratio (S) determined by least squares approximation satisfies the following expression (b):

$$\Delta n(S) = K \times S + C \quad (a)$$

$$|K| < 0.30 \times 10^{-6} \quad (b).$$

Preferably, the optical film further satisfies the following optical property (iii):
(iii) an absolute value of retardation (Re) in the in-plane direction is not higher than 30 nm.

Preferably, the optical film further satisfies the following optical property (iv):
(iv) an absolute value of retardation (Rth) in the thickness direction is not higher than 30 nm.

Preferably, the optical film further satisfies the following optical property (v):
(v) a ratio (Rth/Re) of the retardation (Rth) in the thickness direction to the retardation (Re) in the in-plane direction satisfies the following relation (c):

$$0.1 < Rth/Re < 1 \quad (c).$$

Preferably, the optical film further satisfies the following condition (vi):
(vi) the resin has a glass transition temperature (Tg) of 120° C. or higher.

Preferably, the optical film further satisfies the following condition (vii):
(vii) the resin has total light transmittance of 85% or higher.

The absolute value of a photoelastic coefficient of the optical film comprising the thermoplastic acrylic resin of the present invention is preferably not higher than $3.0 \times 10^{-12}$ $Pa^{-1}$, more preferably not higher than $2.0 \times 10^{-12}$ $Pa^{-1}$, even more preferably not higher than $1.0 \times 10^{-12}$ $Pa^{-1}$.

The photoelastic coefficient is described in various documents (see e.g., Chemical Review, No. 39, 1998 (published by Japan Scientific Societies Press)) and defined according to the following equation:

$$C_R = |\Delta n| \sigma_R$$

$$|\Delta n| = nx - ny$$

wherein $C_R$: photoelastic coefficient, $\sigma_R$: extensional stress, $|\Delta n|$: absolute value of birefringence, nx: refractive index in the extension direction, and ny: refractive index in the direction perpendicular to the extension direction.

A photoelastic coefficient value closer to zero denotes smaller birefringence change caused by external forces and means that birefringence change designed for each application is small.

The optical film, when industrially utilized, is preferably processed by drawing for the purpose of enhancing the mechanical strength of the optical film. However, such drawing might increase birefringence due to the resultant orientation.

In the optical film comprising the thermoplastic acrylic resin of the present invention, a value of a slope K in the equation (a) of linear relationship between birefringence ($\Delta n(S)$) after drawing and a draw ratio (S) determined by least squares approximation satisfies the following expression (b):

$$\Delta n(S) = K \times S + C \quad (a)$$

$$|K| < 0.30 \times 10^{-6} \quad (b).$$

This value of a slope K denotes the degree of increase in birefringence ($\Delta n(S)$) versus a draw ratio (S). A larger K value means a larger increment of birefringence attributed to drawing, while a smaller K value means a smaller increment of birefringence attributed to drawing.

The K value of the optical film comprising the thermoplastic acrylic resin of the present invention is preferably in the range of $|K| < 0.30 \times 10^{-6}$, more preferably $|K| < 0.15 \times 10^{-6}$, even more preferably $|K| < 0.10 \times 10^{-6}$.

In this context, the K value is a value after drawing at a drawing temperature of (Tg+20)° C. (Tg; glass transition temperature of the thermoplastic resin measured by DSC measurement) and a drawing speed of 500 mm/min. In general, it is known that a slower drawing speed offers a smaller increment of birefringence. In this context, the K value can be calculated, for example, by measuring the values of birefringence ($\Delta n(S)$) at draw ratios (S) of 100, 200, and 300 times and finding the best fit line to these values by least squares approximation. Moreover, the draw ratio (S) is a value represented by the following expression:

$$S = \frac{L_1 - L_0}{L_0} \times 100(\%) \quad \text{[Mathematical Expression 1]}$$

wherein $L_0$ represents an inter-chuck distance before drawing, and $L_1$ represents an inter-chuck distance after drawing.

The absolute value of retardation (Re) of the optical film comprising the thermoplastic acrylic resin of the present invention is not higher than 30 nm, preferably not higher than 20 nm, more preferably not higher than 15 nm, particularly preferably not higher than 11 nm, per 100 μm in thickness in the in-plane direction. The absolute value of retardation serves as an index for the degree of birefringence. Thus, the optical film comprising the thermoplastic acrylic resin of the present invention has small birefringence. On the other hand, retardation exceeding 30 nm per 100 μm in thickness in the in-plane direction means high refractive index anisotropy, which cannot be employed in applications that require low birefringence.

In general, it is known that the retardation of an optical film comprising a thermoplastic resin is increased due to drawing. For example, the optical film may be processed by drawing for the purpose of enhancing the mechanical strength of the optical film. However, when the retardation of the resultant drawn optical film exceeds 30 nm per 100 μm in thickness in the in-plane direction, it cannot serve as a low-birefringence film.

The absolute value of retardation (Rth) of the optical film comprising the thermoplastic acrylic resin of the present invention is not higher than 30 nm, preferably not higher than 20 nm, more preferably not higher than 15 nm, particularly preferably not higher than 11 nm, per 100 μm in thickness in the thickness direction. This retardation in the thickness direction serves as an index that correlates with, for example, the viewing angle of a display incorporating the optical film therein. Specifically, a smaller absolute value of retardation in the thickness direction denotes a more favorable viewing angle, leading to smaller display color tone change and contrast reduction depending on the angle at which the display is viewed. Thus, the optical film has a small absolute value of retardation (Rth) in the thickness direction.

The glass transition temperature (Tg) of the optical film is preferably 120° C. or higher, more preferably 130° C. or higher, even more preferably 135° C. or higher. A glass transition temperature lower than 120° C. gives poor dimensional stability under the environmental temperature limit, which cannot be employed in applications that require high heat resistance.

The total light transmittance of the optical film is preferably 85% or higher, more preferably 88% or higher, even more preferably 90% or higher. Total light transmittance lower than 85% gives low transparency, which cannot be employed in applications that require high transparency.

The optical properties of the optical film comprising the thermoplastic acrylic resin of the present invention are characterized by exceedingly small (approximately, zero) birefringence both in the film in-plane direction and in the film thickness direction and a low photoelastic coefficient reduced to the minimum (approximately, zero). Thus, the thermoplastic acrylic resin of the present invention achieves optically perfect isotropy that cannot be achieved by resins previously known in the art. Furthermore, it also achieves high heat resistance.

The optical film comprising the thermoplastic acrylic resin of the present invention is suitable mainly for applications that do not require birefringence, e.g., polarizing plate protective films.

EXAMPLES

Hereinafter, the present invention will be described more specifically with reference to Examples.

Each measurement value used in the present invention is determined according to methods below.
(a) Analysis of Thermoplastic Resin
(1) Repeating Units
(i) A repeating unit derived from a methacrylate monomer, (ii) a repeating unit derived from a vinyl aromatic monomer, (iii) a repeating unit derived from an aromatic group-containing methacrylate monomer, and (iv) an acid anhydride repeating unit were identified by $^1$H-NMR measurement, and their abundance was calculated.

Measuring instrument: DPX-400 manufactured by BRUKER Corp.
Measurement solvent: $CDCl_3$ or $d^6$-DMSO
Measurement temperature: 40° C.
(2) Glass Transition Temperature A glass transition temperature (Tg) was measured according to JIS-K-7121 with α-alumina as a reference in a nitrogen gas atmosphere using a differential scanning calorimeter (Diamond DSC manufactured by Perkin Elmer Japan Co., Ltd.) and calculated by a midpoint method from a DSC curve obtained by heating approximately 10 mg of a sample at a heating rate of 10° C./min from room temperature to 200° C.
(3) Molecular Weight Weight-average and number-average molecular weights were measured using a gel permeation chromatograph (HLC-8220 manufactured by TOSOH Corp.) and determined in terms of commercially available PMMA standards at a temperature set to 40° C. with tetrahydrofuran as a solvent.

(b) Evaluation of Optical Properties
(1) Preparation of Optical Film Sample
(a) Formation of Press Film The resin was preheated at 260° C. for 25 minutes under atmospheric pressure and then compressed at 260° C. and approximately 10 MPa for 5 minutes under vacuum (approximately 10 kPa) using a vacuum compression molding machine (SFV-30 model manufactured by SHINTO Metal Industries Corp.) to form a press film.
(b) Formation of Drawn Film The resin was free-width uniaxially drawn at a drawing temperature of (Tg+20)° C. and a drawing speed of 500 mm/min using a 5t tensile tester manufactured by Instron Corp. to form a drawn film. The draw ratio was set to 100%, 200%, and 300%.
(2) Measurement of Birefringence Birefringence was measured by a rotating analyzer method using RETS-100 manufactured by OTSUKA ELECTRONICS CO., LTD. The birefringence value is a value of light having a wavelength of 550 nm. Birefringence (Δn) was calculated according to the following equation:

$$\Delta n = nx - ny$$

(Δn: birefringence, nx: refractive index in the extension direction, and ny: refractive index in the direction perpendicular to the extension direction)

The absolute value (|Δn|) of birefringence (Δn) was determined according to the following equation:

$$|\Delta n| = |nx - ny|$$

(3) Measurement of Retardation
<In-Plane Retardation>

In-plane retardation was measured at a wavelength ranging from 400 to 800 nm by a rotating analyzer method using RETS-100 manufactured by OTSUKA ELECTRONICS CO., LTD.

The absolute value (|Δn|) of birefringence and the retardation (Re) are in the following relationship:

$$Re = |\Delta n| \times d$$

(|Δn|: absolute value of birefringence, Re: retardation, and d: sample thickness)

Moreover, the absolute value (|Δn|) of birefringence is a value represented by the following equation:

$$|\Delta n| = |nx - ny|$$

(nx: refractive index in the extension direction and ny: in-plane refractive index in the direction perpendicular to the extension direction)
<Retardation in Thickness Direction>

Retardation was measured at a wavelength of 589 nm using a retardation measuring apparatus (KOBRA-21ADH manufactured by Oji Scientific Instruments). The obtained value was converted to that in terms of 100 μm in film thickness as a measurement value.

The absolute value (|Δn|) of birefringence and the retardation (Rth) are in the following relationship:

$$Rth = |\Delta n| \times d$$

(|Δn|: absolute value of birefringence, Rth: retardation, and d: sample thickness)

Moreover, the absolute value (|Δn|) of birefringence is a value represented by the following equation:

$$|\Delta n| = |(nx + ny)/2 - nz|$$

(nx: refractive index in the extension direction, ny: in-plane refractive index in the direction perpendicular to the extension direction, and nz: out-of-plane refractive index in the thickness direction perpendicular to the extension direction) (In an ideal film having perfect isotropy in the three-dimensional direction, both the in-plane retardation (Re) and the retardation (Rth) in the thickness direction are 0.)

(4) Measurement of Photoelastic Coefficient

A birefringence measuring apparatus described in detail in Polymer Engineering and Science 1999, 39, 2349-2357 was used. A film stretching apparatus was placed on a laser light path, and birefringence was measured at 23° C. under extensional stress. A test piece of 6 mm in width was measured at a strain rate of 50%/min (inter-chuck: 50 mm, chuck moving speed: 5 mm/min) during extension. From the relationship of the absolute value ($|\Delta n|$) of birefringence and the extensional stress ($\sigma_R$), a photoelastic coefficient ($C_R$) was calculated by determining a slope of the line by least squares approximation. Data obtained using extensional stress in the range of 2.5 MPa$\leq\sigma_R\leq$10 MPa was used in the calculation.

$$C_R = |\Delta n|/\sigma_R$$

$$|\Delta n| = |nx - ny|$$

($C_R$: photoelastic coefficient, $\sigma_R$: extensional stress, $|\Delta n|$: absolute value of birefringence, nx: refractive index in the extension direction, and ny: refractive index in the direction perpendicular to the extension direction)

[Thermoplastic Resin]

Methyl Methacrylate/Styrene/Benzyl Methacrylate/Maleic Anhydride

Example 1

A jacketed glass reactor (capacity: 1 L) equipped with a stirrer, a temperature sensor, a condenser, a nitrogen gas inlet nozzle, a raw material solution inlet nozzle, an initiator solution inlet nozzle, and a polymerization solution outlet nozzle was used. The pressure of the polymerization reactor was controlled to slight pressure, while the reaction temperature was controlled to 100° C.

518 g of methyl methacrylate (MMA), 48 g of styrene (St), 9.6 g of benzyl methacrylate (BzMA), 384 g of maleic anhydride (MAH), 240 g of methyl isobutyl ketone, and 1.2 g of n-octyl mercaptan were mixed and then subjected to replacement by nitrogen gas to prepare a raw material solution. 0.364 g of 2,2'-azobis(isobutyronitrile) was dissolved in 12.96 g of methyl isobutyl ketone and then subjected to replacement by nitrogen gas to prepare an initiator solution.

The raw material solution was introduced at a rate of 6.98 ml/min into the reactor from the raw material solution inlet nozzle using a pump. Moreover, the initiator solution was introduced at a rate of 0.08 ml/min thereinto from the initiator solution inlet nozzle using a pump. 30 minutes later, a polymer solution was discharged at a constant flow rate of 425 ml/hr from the polymerization solution outlet nozzle using an extraction pump.

The portion of the polymer solution corresponding to the first 1.5-hour discharge was separately collected into a tank for initial flow. The polymer solution was full-scale collected from 1.5 to 2.5 hours after the initiation of discharge. The obtained polymer solution was added dropwise to a solvent methanol to precipitate a pellet, which was in turn purified and dried at 130° C. for 2 hours under vacuum to obtain a thermoplastic resin of interest.

Composition: MMA/St/BzMA/MAH=61/12/1/27 wt %
Molecular weight: Mw=18.8×10$^4$; Mw/Mn=2.08
Tg: 142° C.
The $^1$H-NMR spectrum of this resin is shown in FIG. 1.

Example 2

A thermoplastic resin was obtained by the same procedures as in Example 1 except that those used in Example 1 were changed to 509 g of methyl methacrylate, 48 g of styrene, 19 g of benzyl methacrylate, and 384 g of maleic anhydride.

Composition: MMA/St/BzMA/MAH=62/12/2/24 wt %
Molecular weight: Mw=17.3×10$^4$; Mw/Mn=2.13
Tg: 141° C.

Example 3

A thermoplastic resin was obtained by the same procedures as in Example 1 except that those used in Example 1 were changed to 499 g of methyl methacrylate, 42 g of styrene, 48 g of benzyl methacrylate, and 371 g of maleic anhydride.

Composition: MMA/St/BzMA/MAH=60/11/5/24 wt %
Molecular weight: Mw=20.2×10$^4$; Mw/Mn=2.36
Tg: 138° C.

Comparative Example 1

A thermoplastic resin was obtained by the same procedures as in Example 1 except that those used in Example 1 were changed to 469 g of methyl methacrylate, 37 g of styrene, 96 g of benzyl methacrylate, and 358 g of maleic anhydride.

Composition: MMA/St/BzMA/MAH=59/7/12/22 wt %
Molecular weight: Mw=18.0×10$^4$; Mw/Mn=2.12
Tg: 133° C.

Comparative Example 2

A thermoplastic resin was obtained by the same procedures as in Example 1 except that those used in Example 1 were changed to 768 g of methyl methacrylate, 144 g of styrene, and 48 g of maleic anhydride without the use of benzyl methacrylate.

Composition: MMA/St/MAH=76/17/7 wt %
Molecular weight: Mw=13.4×10$^4$; Mw/Mn=2.01
Tg: 128° C.

Methyl Methacrylate/Styrene/Benzyl Methacrylate/Methacrylic Acid/Glutaric Anhydride

Example 4

A jacketed glass reactor (capacity: 1 L) equipped with a stirrer, a temperature sensor, a condenser, a nitrogen gas inlet nozzle, a raw material solution inlet nozzle, an initiator solution inlet nozzle, and a polymerization solution outlet nozzle was used. The pressure of the polymerization reactor was controlled to slight pressure, while the reaction temperature was controlled to 100° C.

900 g of methyl methacrylate, 36 g of styrene, 48 g of benzyl methacrylate, 216 g of methacrylic acid (MAA), 240 g of methyl isobutyl ketone, and 1.2 g of n-octyl mercaptan were mixed and then subjected to replacement by nitrogen gas to prepare a raw material solution. 0.364 g of 2,2'-azobis (isobutyronitrile) was dissolved in 12.96 g of methyl isobutyl ketone and then subjected to replacement by nitrogen gas to prepare an initiator solution.

The raw material solution was introduced at a rate of 6.98 ml/min into the reactor from the raw material solution inlet nozzle using a pump. Moreover, the initiator solution was introduced at a rate of 0.08 ml/min thereinto from the initiator solution inlet nozzle using a pump. 30 minutes later, a polymer solution was discharged at a constant flow rate of 425 ml/hr from the polymerization solution outlet nozzle using an extraction pump.

The portion of the polymer solution corresponding to the first 1.5-hour discharge was separately collected into a tank for initial flow. The polymer solution was full-scale collected from 1.5 to 2.5 hours after the initiation of discharge. The obtained polymer solution was added dropwise to a solvent methanol to precipitate a pellet, which was in turn purified and dried at 130° C. for 2 hours under vacuum to obtain a precursor. The precursor was heat-treated (treatment temperature: 250° C., degree of vacuum: 133 hPa (100 mmHg)) using Laboplastomill with a devolatilization apparatus to obtain a thermoplastic resin of interest.

Composition: MMA/St/BzMA/MAA/glutaric anhydride=70/5/4/4/21 wt %
Molecular weight: Mw=11.4×10$^4$; Mw/Mn=2.40
Tg: 128° C.

Comparative Example 3

A thermoplastic resin was obtained by the same procedures as in Example 4 except that those used in Example 4 were changed to 888 g of methyl methacrylate, 60 g of styrene, and 252 g of methacrylic acid without the use of benzyl methacrylate.

Composition: MMA/St/MAA/glutaric anhydride=64/9/4/23 wt %
Molecular weight: Mw=10.0×10$^4$; Mw/Mn=2.09
Tg: 131° C.

Comparative Example 4

A thermoplastic resin was obtained by the same procedures as in Example 1 except that those used in Example 1 were changed to 960 g of methyl methacrylate.

Composition: MMA=100 wt %
Molecular weight: Mw=10×10$^4$; Mw/Mn=1.89
Tg: 121° C.

These polymerization results are shown in Table 1.

TABLE 1

| | Thermoplastic resin | | | | | | | | |
|---|---|---|---|---|---|---|---|---|---|
| | Composition (wt %) | | | | | | Tg | GPC | |
| No. | MMA | St | BzMA | MAH | MAA | GAH*[1] | (° C.) | Mw × 10$^4$ | Mw/Mn |
| Example 1 | 61 | 12 | 1 | 27 | — | — | 142 | 18.8 | 2.08 |
| Example 2 | 62 | 12 | 2 | 24 | — | — | 141 | 17.3 | 2.13 |
| Example 3 | 60 | 11 | 5 | 24 | — | — | 138 | 20.2 | 2.36 |
| Example 4 | 70 | 5 | 4 | — | 4 | 21 | 128 | 11.4 | 2.40 |
| Comparative Example 1 | 59 | 7 | 12 | 22 | — | — | 133 | 18.0 | 2.12 |
| Comparative Example 2 | 76 | 17 | — | 7 | — | — | 128 | 13.4 | 2.01 |
| Comparative Example 3 | 64 | 9 | — | — | 4 | 23 | 131 | 10.0 | 2.39 |
| Comparative Example 4 | 100 | — | — | — | — | — | 121 | 10.2 | 1.89 |

*[1]GAH = glutaric anhydride

Examples 5 to 8 and Comparative Examples 5 to 8

The thermoplastic resins obtained in Examples 1 to 4 and Comparative Examples 1 to 4 were used and molded into press films according to the method described above. 100%-drawn films were formed from the press films according to the method described above and evaluated for their optical properties. The measurement results are shown in Table 2.

TABLE 2

| | Optical film properties (free-width uniaxially 100%-drawn, values in terms of 100 μm in thickness) | | | | | | | |
|---|---|---|---|---|---|---|---|---|
| No. | Thermoplastic resin | Tg (° C.) | Drawing temperature (° C.) | Photoelastic coefficient (×10$^{-12}$ Pa$^{-1}$) | Re/nm | Rth/nm | Light transmittance (%) | Optical properties |
| Example 5 | Example 1 | 142 | 162 | −0.6 | 3.3 | 1.6 | >85 | ○ |
| Example 6 | Example 2 | 141 | 161 | 0.1 | 8.3 | 3.8 | >85 | ○ |
| Example 7 | Example 3 | 138 | 158 | 1.6 | 14 | 6.3 | >85 | ○ |
| Example 8 | Example 4 | 128 | 148 | −1.19 | −15 | — | >85 | ○ |
| Comparative Example 5 | Comparative Example 1 | 133 | 153 | 4.8 | 40 | 19 | >85 | X |
| Comparative Example 6 | Comparative Example 2 | 128 | 148 | −2.5 | −74 | −41 | >85 | X |
| Comparative Example 7 | Comparative Example 3 | 131 | 151 | −2.2 | −78 | — | >85 | X |
| Comparative Example 8 | Comparative Example 4 | 121 | 141 | −4.7 | 37 | — | >85 | X |

The optical film comprising the thermoplastic acrylic resin of the present invention simultaneously achieves low birefringence and a small photoelastic coefficient (○) as optical properties. On the other hand, the optical film comprising the thermoplastic resin of Comparative Example has poor optical properties, e.g., a large photoelastic coefficient (×).

Moreover, the results of Examples 5 to 8 and Comparative Example 1 demonstrate that a photoelastic coefficient is controlled depending on a benzyl methacrylate content and that its absolute value takes a value as exceedingly small as not higher than $2.0 \times 10^{-12}$ $Pa^{-1}$ at a benzyl methacrylate content within the range of 0.1 to 5% by weight. For example, Japanese Patent Laid-Open No. 2007-169622 as the conventional art discloses a method for controlling a photoelastic coefficient by the addition of an organic lower-molecular-weight compound. In this method, the obtained resin, when processed by molding or used as a molding for optical material, still has optical properties that may be changed due to the bleedout of the added compound, etc. The thermoplastic acrylic resin of the present invention never has bleedout, etc. and can exhibit stable optical properties because the component for controlling the photoelastic coefficient is copolymerized in the main chain of the polymer.

Examples 9 and 10 and Comparative Example 9

The thermoplastic resins obtained in Examples 1 and 3 and Comparative Example 4 were used and molded into press films according to the method described above. 100%-, 200%-, and 300%-drawn films were formed from the press films according to the method described above and evaluated for their optical properties. The measurement results are shown in Table 3.

mm) 100%-, 200%-, and 300%-drawn films were formed from the obtained extruded film according to the method described above (drawing speed was appropriately changed) and evaluated for their optical properties. The measurement results are shown in Table 4.

TABLE 4

Optical properties and change in optical properties caused by molding processing

| | | No. Example 13 (Example 1 equivalent) | | | |
|---|---|---|---|---|---|
| Thermoplastic resin | | | | | |
| Drawing conditions | Temperature (° C.) | — | 162 | 162 | 162 |
| | Ratio (%) | 0 | 100 | 200 | 300 |
| Film properties (in terms of 100 μm in thickness) | Positive or negative intrinsic birefringence | | Positive | | |
| | Re/nm (@550 nm) | 2.3 | 10.4 | 10.9 | 12.7 |
| | Absolute value of birefringence ($\times 10^{-5}$ @550 nm) | 2.3 | 10.4 | 10.9 | 12.7 |
| | Rate of birefringence change |K| | | $0.08 \times 10^{-5}$ | | $0.04 \times 10^{-5}$ |
| | Rth (nm, in 100%-drawn film) | | — | | |
| | Photoelastic coefficient ($\times 10^{-12}$ $Pa^{-1}$) | | −0.6 | | |
| Change in optical properties caused by molding processing | | | ◉ | | |

◉: exceedingly small,
○: small,
X: significant

These results demonstrate that the optical film comprising the thermoplastic acrylic resin of the present invention is excellent in heat resistance and also has high optical isotropy

TABLE 3

Optical properties and change in optical properties caused by molding processing

| | | No. | | | | | | | | | |
|---|---|---|---|---|---|---|---|---|---|---|---|
| Thermoplastic resin | | Example 11 (Example 1) | | | | Example 12 (Example 3) | | | Comparative Example 9 (Comparative Example 4) | | |
| Drawing conditions | Temperature (° C.) | — | 162 | 162 | 162 | — | 158 | 158 | — | 140 | 140 |
| | Ratio (%) | 0 | 100 | 200 | 300 | 0 | 100 | 200 | 0 | 100 | 200 |
| Film properties (in terms of 100 mm in thickness) | Positive or negative intrinsic birefringence | | Positive | | | | Positive | | | Negative | |
| | Re/nm (@550 nm) | 0.7 | 3.3 | 5.4 | 6.7 | 1.3 | 14 | 22 | −1.0 | −37 | −67 |
| | Absolute value of birefringence ($\times 10^{-5}$ @550 nm) | 0.7 | 3.3 | 5.4 | 6.7 | 1.3 | 14 | 22 | 1.0 | 37 | 67 |
| | Rate of birefringence change |K| | | $0.02 \times 10^{-5}$ | | | | $0.10 \times 10^{-5}$ | | | $-0.3 \times 10^{-5}$ | |
| | Rth (nm, in 100%-drawn film) | | 1.6 | | | | 6.3 | | | — | |
| | Photoelastic coefficient ($\times 10^{-12}$ $Pa^{-1}$) | | −0.6 | | | | 1.6 | | | −4.7 | |
| Change in optical properties caused by molding processing | | | ◉ | | | | ○ | | | X | |

◉: exceedingly small,
○: small,
X: significant

Example 11

A thermoplastic resin obtained by the same procedures as in Example 1 was used and extrusion-molded into a film by adjusting the in-cylinder resin temperature and T-die temperature of an extruder equipped with a T-die (KZW15TW-25MG-NH model manufactured by TECHNOVEL Corp., equipped with a T-die of 150 mm in width, lip thickness: 0.5 of optical properties (exceedingly small birefringence value and exceedingly small photoelastic coefficient) that cannot be achieved by conventional material. Moreover, it is demonstrated that the thermoplastic acrylic resin of the present invention has an exceedingly small rate of birefringence change, when molded into films or subsequently arbitrarily drawn. This feature is exceedingly advantageous in terms of the absence of birefringence occurrence because the resin is not influenced by orientation attributed to flow during melt molding even when extrusion-molded into films or subsequently processed by drawing.

These properties are suitable for applications such as polarizing plate protective films.

Examples 12 and 13

The drawn film obtained in Example 5 was left standing in an atmosphere involving a temperature of 80° C. and 90% humidity to prepare two drawn films differing in the rate of hydrolysis. These films were evaluated for their optical properties. The measurement results are shown in Table 5.

TABLE 5

Rate of hydrolysis and optical film properties (free-width uniaxially 100%-drawn, values in terms of 100 μm in thickness)

| No. | Thermoplastic resin | Rate of hydrolysis (mol %) | Re/nm | Optical properties |
|---|---|---|---|---|
| Example 5 | Example 1 | 0 | 3.3 | ○ |
| Example 12 | Example 1 | 5 | 0.1 | ○ |
| Example 13 | Example 1 | 10 | -5.2 | ○ |

These results demonstrate that the optical film comprising the thermoplastic acrylic resin of the present invention sufficiently maintains its low birefringence as long as the rate of hydrolysis is lower than 10% by mol.

INDUSTRIAL APPLICABILITY

A molding for optical material comprising a thermoplastic acrylic resin of the present invention has high heat resistance and excellent optical properties and exhibits industrially advantageous melt moldability. Therefore, the molding for optical material can be used suitably in polarizing plate protective films used in liquid crystal displays, plasma displays, organic EL displays, field emission displays, and displays for rear projection television, retarder films (e.g., quarter- or half-wave plates), optical compensation films for liquid crystals (e.g., viewing angle control films), display front panels, display boards, lenses, transparent substrates used in solar cells, etc.

In addition, the molding for optical material can also be used in waveguides, lenses, optical fibers, covering material for optical fibers, LED lenses, lens covers, etc., in the fields of optical communication, optical switching, and optical measurement systems.

The invention claimed is:

1. A thermoplastic acrylic resin comprising: 10 to 70% by weight of a repeating unit derived from a methacrylate monomer represented by the following formula (1); 5 to 40% by weight of a repeating unit derived from a vinyl aromatic monomer represented by the following formula (2); 0.1 to 3% by weight of a repeating unit derived from an aromatic group-containing methacrylate monomer represented by the following formula (3); and 20 to 50% by weight of a cyclic acid anhydride repeating unit represented by the following formula (4) or (5), said thermoplastic acrylic resin as a weight-average molecular weight in the average of 10,000 to 400,000 and a molecular weight distribution in the range of 1.8 to 3.0 determined by a GPC measurement method:

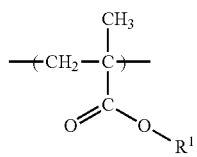
(1)

wherein $R^1$ represents a linear or branched alkyl group having 1 to 12 carbon atoms, or a cycloalkyl group having 5 to 12 carbon atoms,

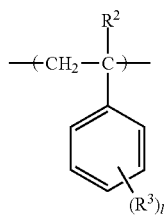
(2)

wherein $R^2$ is a hydrogen and $R^3$ represents hydrogen, halogen, a hydroxyl group, an alkoxy group, a nitro group, or a linear or branched alkyl group having 1 to 12 carbon atoms, and I represents an integer of 1 to 3,

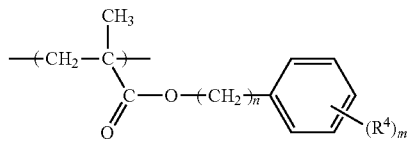
(3)

wherein $R^4$ represents hydrogen, halogen, a hydroxyl group, an alkoxy group, a nitro group, or a linear or branched alkyl group having 1 to 12 carbon atoms, m represents an integer of 1 to 3, and n represents an integer of 0 to 2, (4)

(5)

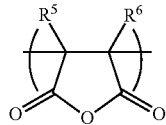

wherein $R^5$ to $R^8$ may be the same or different and each represents hydrogen or a linear or branched alkyl group having 1 to 12 carbon atoms, and wherein the thermoplastic acrylic resin further satisfies the following optical property (iii): (iii) an absolute value of retardation (Re) in the in-plane direction is not higher than 30 nm.

2. The thermoplastic acrylic resin according to claim 1, characterized in that a molar ratio (B/A) of a content (B) of the cyclic acid anhydride repeating unit to a content (A) of the repeating unit derived from a vinyl aromatic monomer is larger than 1 and not larger than 10.

3. The thermoplastic acrylic resin according to claim 1, wherein the repeating unit derived from a methacrylate monomer is derived from methyl methacrylate, the repeating unit derived from a vinyl aromatic monomer is derived from styrene, the repeating unit derived from an aromatic group-containing methacrylate monomer is derived from benzyl methacrylate, and the cyclic acid anhydride repeating unit is derived from maleic anhydride.

4. The thermoplastic acrylic resin according to claim 1, wherein the thermoplastic acrylic resin satisfies the following optical property (i):
   (i) an absolute value of a photoelastic coefficient is not higher than $3.0 \times 10^{-12}$ $Pa^{-1}$.

5. The thermoplastic acrylic resin according to claim 1, wherein the thermoplastic acrylic resin satisfies the following optical property (ii):
   (ii) a value of a slope K in the equation (a) of linear relationship between birefringence ($\Delta n(S)$) after drawing and a draw ratio (S) determined by least squares approximation satisfies the following expression (b):

$$\Delta n(S) = K \times S + C \qquad (a)$$

$$|K| < 0.30 \times 10^{-6} \qquad (b).$$

6. The thermoplastic acrylic resin according to claim 1, wherein the thermoplastic acrylic resin further satisfies the following optical property (iv):
   (iv) an absolute value of retardation (Rth) in the thickness direction is not higher than 30 nm.

7. The thermoplastic acrylic resin according to claim 1, wherein the thermoplastic acrylic resin further satisfies the following optical property (v):
   (v) a ratio (Rth/Re) of the retardation (Rth) in the thickness direction to the retardation (Re) in the in-plane direction satisfies the following expression (c):

$$0.1 < Rth/Re < 1 \qquad (c).$$

8. The thermoplastic acrylic resin according to claim 1, characterized in that the thermoplastic acrylic resin further satisfies the following condition (vi):
   (vi) the resin has a glass transition temperature (Tg) of 120° C. or higher.

9. The thermoplastic acrylic resin according to claim 1, characterized in that the thermoplastic acrylic resin further satisfies the following condition (vii):
   (vii) the resin has total light transmittance of 85% or higher.

10. A molding for optical material comprising a thermoplastic acrylic resin according to claim 1.

11. The molding for optical material according to claim 10, wherein the molding for optical material is an optical film.

12. The optical film according to claim 11, characterized in that the optical film is a film which is formed by extrusion molding and drawn at a draw ratio of 0.1 to 300% at least in the uniaxial direction.

13. The optical film according to claim 11, characterized in that the optical film is a film which is formed by cast molding and drawn at a draw ratio of 0.1 to 300% at least in the uniaxial direction.

14. A polarizing plate protective film comprising an optical film according to claim 11.

15. A retarder film comprising an optical film according to claim 11.

16. The molding for optical material according to claim 10, wherein the molding for optical material is an optical lens.

* * * * *